Oct. 28, 1930.  H. M. REED  1,779,827
KITCHEN UTENSIL
Filed Feb. 21, 1927
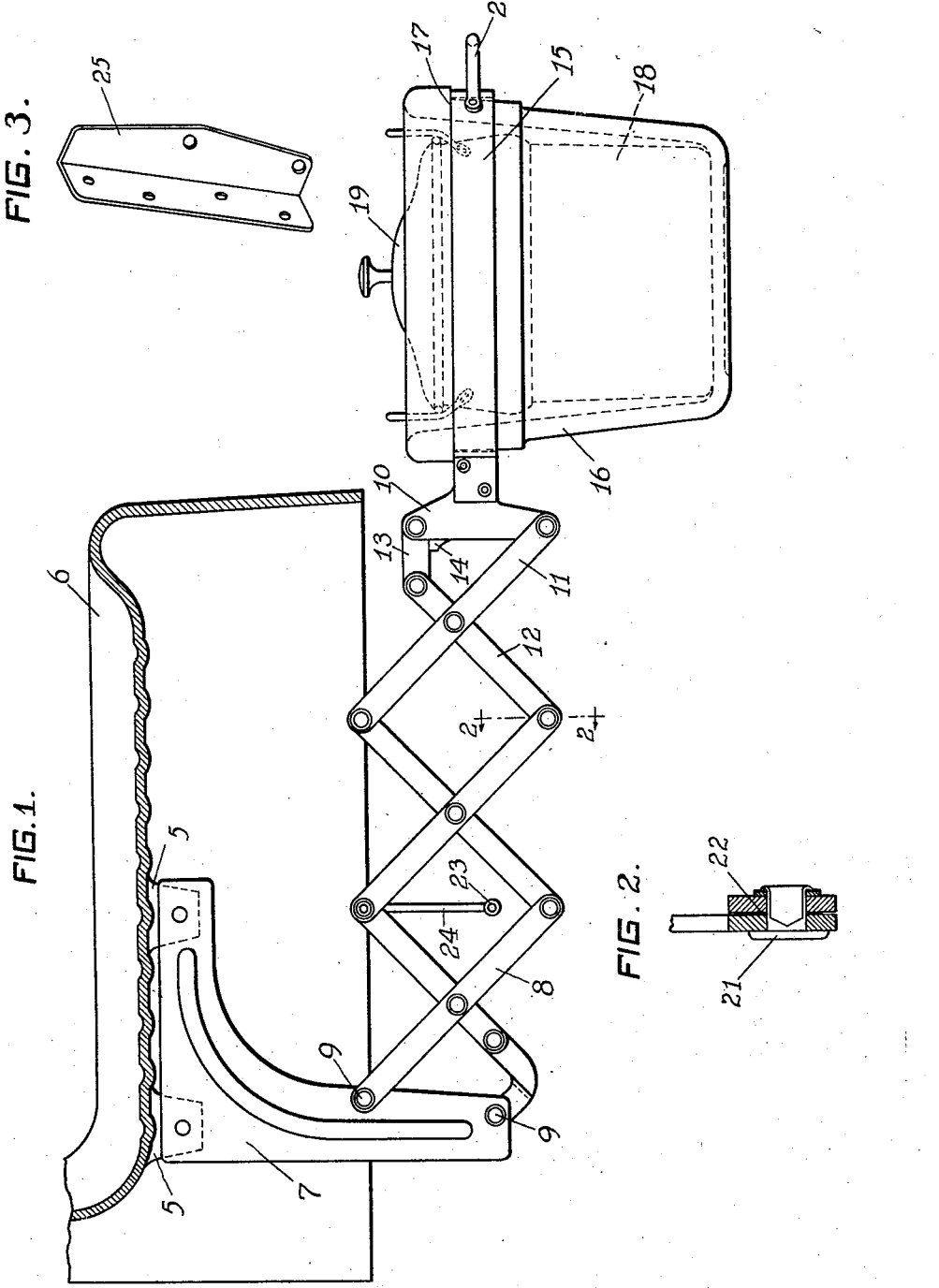
INVENTOR
Henry M. Reed
By Green and McCallister
His Attorneys Patented Oct. 28, 1930

1,779,827

UNITED STATES PATENT OFFICE

HENRY M. REED, OF BEN AVON, PENNSYLVANIA, ASSIGNOR TO STANDARD SANITARY MANUFACTURING COMPANY, A CORPORATION OF NEW JERSEY

KITCHEN UTENSIL

Application filed February 21, 1927. Serial No. 169,812.

This invention relates to kitchen utensils and more particularly to an improved type of refuse receptacle and receptacle support for kitchen use.

Various attempts have heretofore been made to overcome the disadvantages and unpleasant features incident to the usual perforated refuse receiver normally employed in the sink proper by substituting for such an arrangement a closed refuse container or receptacle mounted on a movable support adapted to be moved to an out of the way position such, for example, as beneath the sink or the associated drain board. Such arrangements, however, have not been entirely successful and an object of this invention is to provide a device of the type set forth of improved arrangement, rugged and sanitary in construction, easily operated and relatively cheap to manufacture and assemble.

This and other objects which will be apparent to those skilled in this particular art are accomplished by means of the invention illustrated in the accompanying drawings, in which Figure 1 is a view in elevation of a refuse receptacle together with an improved form of support constructed in accordance with one embodiment of this invention and showing the same secured to the bottom of a drain board. Fig. 2 is a sectional view on the line 2—2 of Fig. 1; and Fig. 3 is a perspective view of a different form of bracket adapted to be employed in securing the device to a wall or other vertical support.

The particular form of this invention which has been chosen for the purposes of illustration is shown as secured to the bottom lugs 5 of a drain board 6 by means of a ribbed, substantially L-shaped supporting bracket 7. An extensible receptacle support is mounted upon the bracket and, as illustrated, consists of lazy tongs 8 pivoted to supporting pins 9 adjacent the forward edge of the bracket. The front end of the lazy tongs is provided with an end member 10 directly pivoted at its bottom to the end of an adjacent link 11 of the lazy tongs while the upper end is connected to the other adjacent link 12 by a short connecting link 13 adapted to engage a stop 14 on the end member when the lazy tongs are in extended position so as to limit the opening movement thereof.

An annular band or collar 15 extends horizontally outwardly from the end member 10 for the purpose of removably supporting a container 16 having an annular shoulder 17 for engaging the supporting collar. The container is adapted to hold a refuse receptacle 18 normally closed tightly by a lid 19 and removable from the container for cleaning and emptying purposes. A handle 20 is secured to the container supporting collar for extending the lazy tongs so as to position the receptacle in accessible position or for retracting the lazy tongs to move the receptacle out of the way beneath the associated drain board.

The various links forming the lazy tongs are joined together by rivets 21 and a friction washer 22 is interposed between the links at each joint for the purpose of providing sufficient friction to hold the lazy tongs in whatever position they are placed. The inward movement of the tongs is limited by a resilient bumper 23 of rubber or the like, which is so positioned as to be interposed between two of the adjacent links and which, as illustrated, is supported at the end of a bumper supporting rod 24, depending downwardly from one of the link joints. Obviously, when the tongs are retracted or closed the bumper, being interposed between two connecting links, will limit the closing movement thereof.

One of the advantages of the present invention is that it can be secured to a vertical support such, for example, as a wall bracket beneath the drain board or associated sink when necessary. In case the particular drain board in question is not provided with depending lugs 5 or the like a wall bracket 25, such as that illustrated in Fig. 3, can be employed and the lazy tongs secured thereto instead of to the L-shaped supporting bracket 7. Such an arrangement is not only desirable, but is obviously impossible with similar devices constructed solely for the purpose of being mounted upon some part of the sink assembly.

What I claim as new and desire to secure by Letters Patent is:

1. The combination with an extension bracket comprising lazy tongs and means for supporting said tongs at one end thereof, of a vertical end member pivotally secured to the movable end of said lazy tongs, said member having a lug extending from the inner-face of the thickness thereof for limiting the extension of said tongs.

2. The combination with an extension bracket comprising lazy tongs and means for supporting said tongs at one end thereof, of a bumper disposed between adjacent links of said tongs for limiting the inward movement thereof, said bumper being disposed at the end of a downwardly depending supporting rod secured to one of the link joints.

3. The combination in a support for a refuse receptacle, of lazy tongs provided with an end member including a receptacle support, means disposed between cooperating members of said lazy tongs for limiting contraction thereof, said means comprising a bumper disposed on a downwardly depending supporting rod secured to one of the link joints.

4. The combination in a support for a refuse receptacle, of lazy tongs provided with an end member including a receptacle support, means disposed between cooperating members of said lazy tongs for limiting contraction thereof, said means comprising a bumper disposed on a downwardly depending supporting rod secured to one of the link joints, and said end member having a lug extending from the inner face of the thickness thereof for limiting the extension of said tongs.

5. The combination with an extension bracket comprising lazy tongs and means for supporting said tongs, of a vertical end member pivotally secured to one end of said tongs, said member having an extending lug secured thereto and cooperating with an adjacent link of the tongs for limiting the extension of the tongs.

6. The combination with an extension bracket comprising lazy tongs and means for supporting said tongs, of a bumper disposed between adjacent links of said tongs for limiting the inward movement thereof, said bumper being disposed at the end of a rod secured to one of the link joints.

7. The combination in a support for refuse receptacles, of lazy tongs provided with an end member including a receptacle support, means for supporting said tongs at the other end thereof, and means for limiting the extension of said tongs which includes a lug mounted on said end member and cooperating with an adjacent link member.

8. The combination in a support for refuse receptacles, of lazy tongs provided with an end member including a receptacle support, means for supporting said tongs at the other end thereof, and means for limiting the contraction of said tongs which includes a bumper disposed at the end of a depending supporting rod, said rod being secured to one of the link joints.

9. The combination in a support for refuse receptacles, of lazy tongs provided with an end member including a receptacle support, means for supporting said tongs at the other end thereof, and means for limiting the extension of said tongs which includes a lug mounted on said end member and cooperating with an adjacent link member, and additional means for limiting the contraction of said tongs which includes a bumper disposed between adjacent links of said tongs and secured to and extending from one of the link joints.

In testimony whereof, I have hereunto subscribed my name this 18th day of February, 1927.

HENRY M. REED.